United States Patent
Hoshina et al.

(10) Patent No.: US 11,211,601 B2
(45) Date of Patent: Dec. 28, 2021

(54) ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Keigo Hoshina, Yokohama (JP); Wen Zhang, Sagamihara (JP); Yasuhiro Harada, Isehara (JP); Norio Takami, Yokohama (JP)

(73) Assignees: KABUSHIKI KAISHA TOSHIBA, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 133 days.

(21) Appl. No.: 16/296,844

(22) Filed: Mar. 8, 2019

(65) Prior Publication Data
US 2020/0091505 A1 Mar. 19, 2020

(30) Foreign Application Priority Data
Sep. 18, 2018 (JP) .............................. JP2018-174164

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

| 2009/0142651 A1 | 6/2009 | Minami et al. |
| 2014/0193714 A1* | 7/2014 | Kim ...................... H01M 4/364 |
| | | 429/220 |

(Continued)

FOREIGN PATENT DOCUMENTS

| JP | 2012-221672 | 11/2012 |
| JP | 2015-167127 | 9/2015 |
| WO | WO 2018/020668 A1 | 2/2018 |

OTHER PUBLICATIONS

Mitsuji et al. (JP, 2017-152114) (a raw machine translation) (Aug. 31, 2017) (Year: 2017).*

*Primary Examiner* — Carmen V Lyles-Irving
(74) *Attorney, Agent, or Firm* — Oblon, McClelland, Maier & Neustadt, L.L.P.

(57) ABSTRACT

According to one embodiment, an electrode is provided. The electrode includes an active material-containing layer. The active material-containing layer includes an active material and a conductive agent. The active material contains primary particles of a niobium-titanium composite oxide. The conductive agent contains fibrous carbon. The primary particles have an average particle size of 0.3 μm or more and 2 μm or less. At least a part of a surface of the primary particles is coated with the fibrous carbon. A covering ratio of the primary particles by the fibrous carbon is 0.01% or more and 40% or less.

20 Claims, 8 Drawing Sheets

(51) Int. Cl.
*H01M 4/485* (2010.01)
*H01M 4/505* (2010.01)
*H01M 4/62* (2006.01)
*H01M 10/0525* (2010.01)
*H01M 10/0566* (2010.01)
*B82Y 30/00* (2011.01)

(52) U.S. Cl.
CPC ....... *H01M 4/621* (2013.01); *H01M 10/0525* (2013.01); *H01M 10/0566* (2013.01); *B82Y 30/00* (2013.01); *C01P 2004/51* (2013.01); *C01P 2004/61* (2013.01); *H01M 2220/20* (2013.01)

(56) References Cited

U.S. PATENT DOCUMENTS

| | | | |
|---|---|---|---|
| 2017/0077547 A1* | 3/2017 | Takami | H01M 4/48 |
| 2017/0162872 A1 | 6/2017 | Takami et al. | |
| 2017/0222225 A1* | 8/2017 | Kang | H01M 4/525 |
| 2017/0271682 A1* | 9/2017 | Matsuno | B60L 58/24 |
| 2019/0296351 A1* | 9/2019 | Yoshima | B60L 3/12 |

* cited by examiner

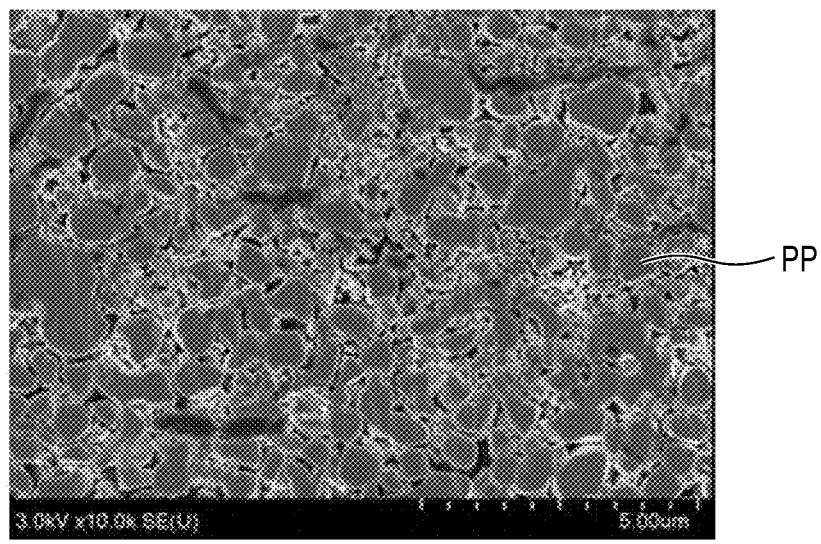
F I G. 1
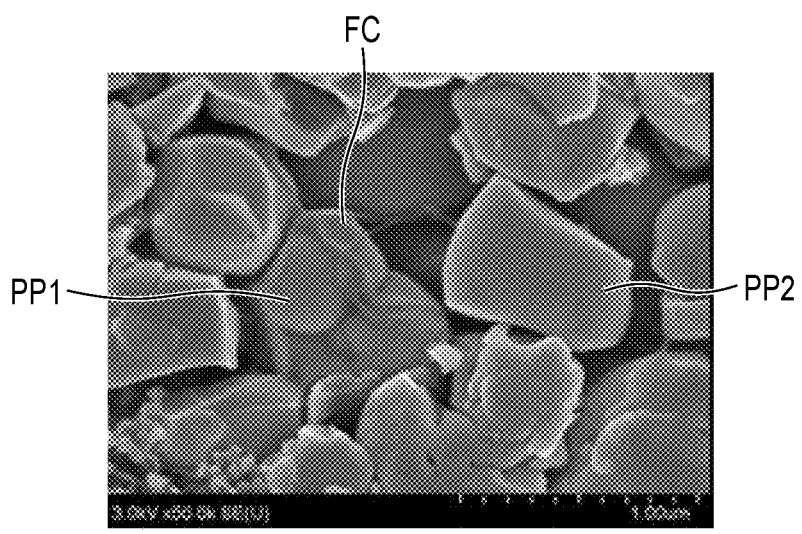
F I G. 2

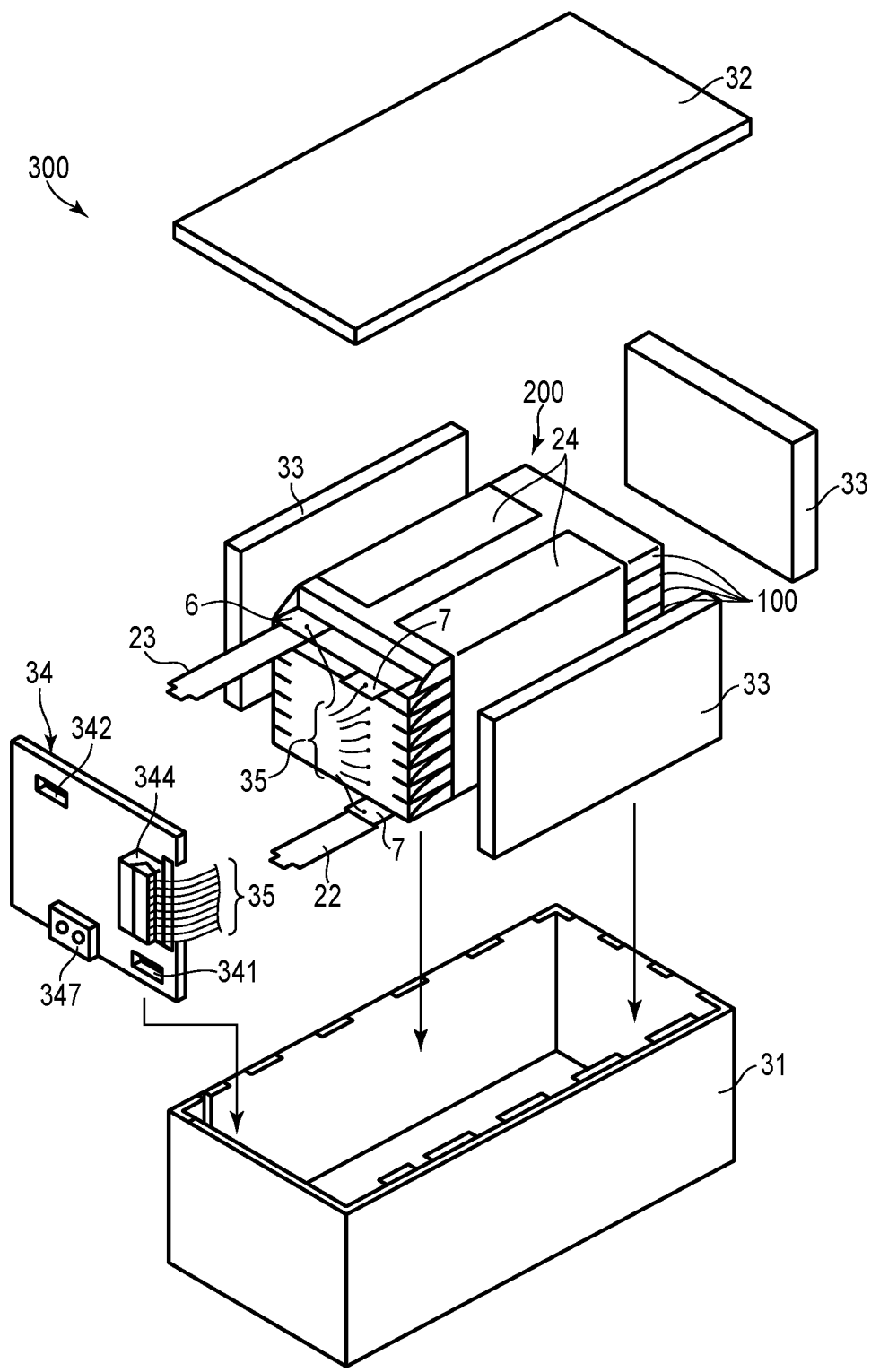
F I G. 8

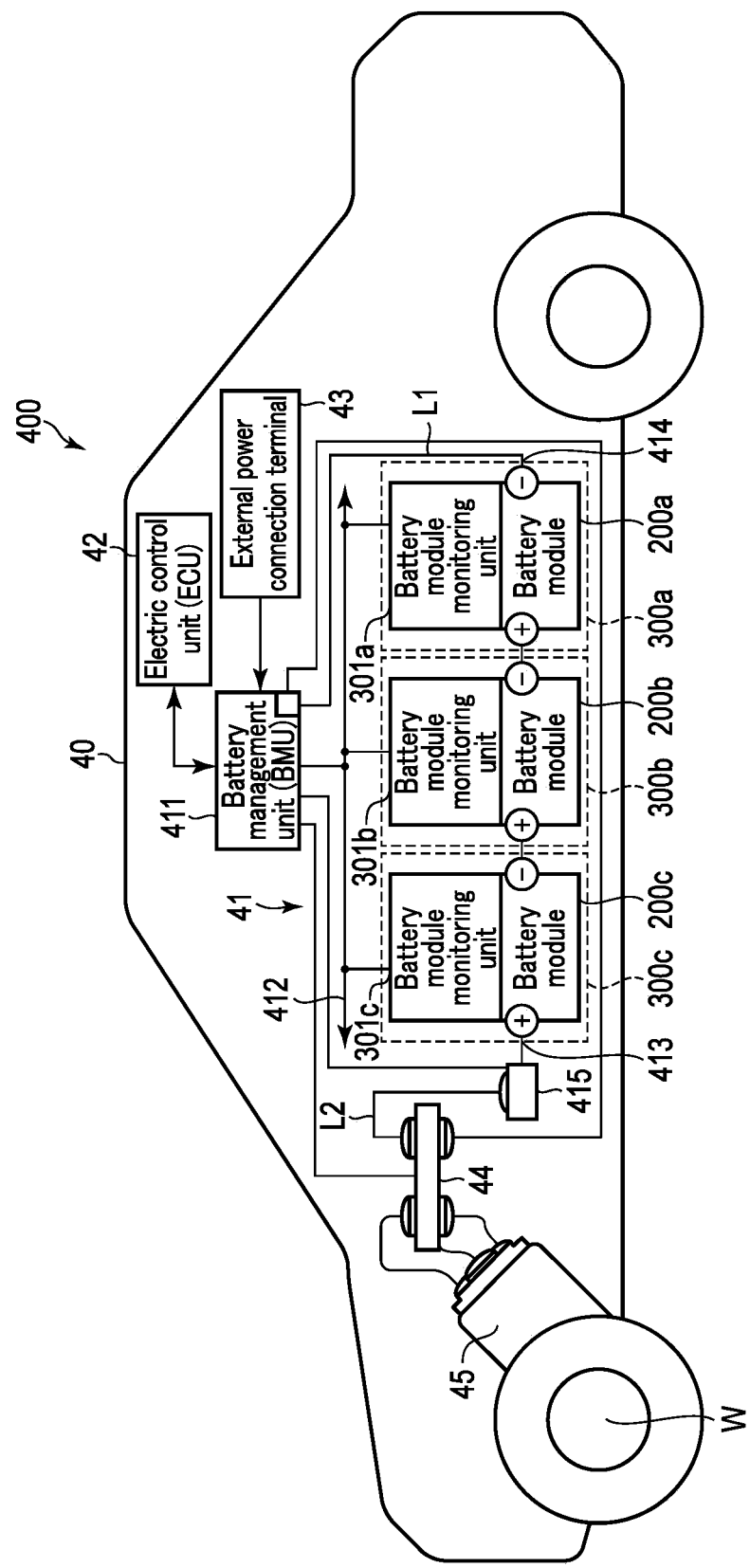
F I G. 11

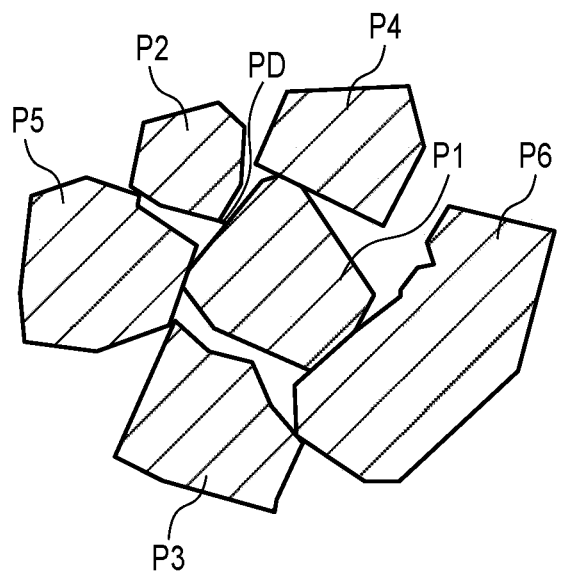
F I G. 12
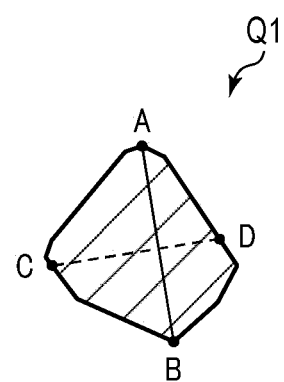
F I G. 13

ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-174164, filed Sep. 18, 2018, the entire contents of which are incorporated herein by reference.

FIELD

Embodiments described herein relate generally to an electrode, a secondary battery, a battery pack, and a vehicle.

BACKGROUND

The secondary battery such as a nonaqueous electrolyte battery is expected to be used as a medium-to-large power source, such as in-vehicle use and stationary use, in addition to the use as a power source for small electronic devices. Excellent performance in terms of life performance, safety, and input-output performance is required, particularly in the use as the medium-to-large power source.

Examples of one of the methods of improving the performances include use of a titanium composite oxide as the active material. The titanium composite oxide is used as the active material, so that it is possible to obtain a secondary battery excellent in life performance, safety, and input-output performance, as compared with a case in which a carbonaceous substance such as graphite is used as the active material. However, the electrical conductivity of the titanium composite oxide is lower than the electrical conductivity of the carbonaceous substance.

Therefore, in the case of using the titanium composite oxide as the active material, increasing the blending amount of the conductive agent in the electrode, using a composite of carbon and titanium composite oxide particles, and the like are proposed for the purpose to enhance the electrical conductivity of the electrode.

BRIEF DESCRIPTION OF THE DRAWINGS

FIG. 1 is an example of a scanning electron micrograph showing a section of the active material-containing layer;

FIG. 2 is another example of a scanning electron micrograph showing a section of the active material-containing layer;

FIG. 8 is an exploded perspective view schematically showing an example of the battery pack according to the embodiment;

FIG. 11 is a view schematically showing another example of the vehicle according to the embodiment;

FIG. 12 is a schematic view schematically showing a section of the active material-containing layer; and FIG. 13 is a schematic view showing a section of a primary particle of an active material.

DETAILED DESCRIPTION

Figure 3:
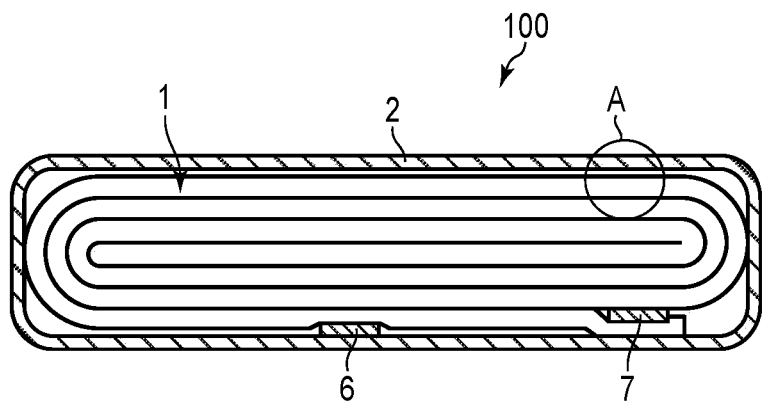
FIG. 3 is a cross-sectional view schematically showing an example of a secondary battery according to the embodiment.

According to one embodiment, an electrode is provided. The electrode includes an active material-containing layer. The active material-containing layer includes an active material and a conductive agent. The active material contains primary particles of a niobium-titanium composite oxide. The conductive agent contains fibrous carbon. The primary particles have an average particle size of 0.3 µm or more and 2 µm or less. At least a part of a surface of the primary particles is coated with the fibrous carbon. A covering ratio of the primary particles by the fibrous carbon is 0.01% or more and 40% or less.

According to another embodiment, a secondary battery is provided. The secondary battery includes a negative electrode, a positive electrode, and an electrolyte. The negative electrode includes the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

According to this embodiment, there are provided an electrode excellent in input-output performance and life performance, a secondary battery including the electrode, a battery pack, and a vehicle.

In the case of using the niobium-titanium composite oxide as the negative electrode active material, there is a tendency that the electrical conductivity is reduced in a low state of charge (SOC), i.e., in a state where the negative electrode active material does not be sufficiently inserted lithium ions. In order to enhance the electrical conductivity of the active material, a conductive agent of carbon particles may be disposed between the primary particles of the active material. The carbon particles disposed between the primary particles are connected each other in the form of mesh, thereby forming an electronic conductive network (i.e., a conductive path). The conductive path is formed, thereby enhancing the electrical conductivity between the primary particles of the active material.

However, when the secondary battery is charged, the negative electrode active material is inserted lithium ions. Thus, the shape of the primary particles of the negative electrode active material can be expanded. Further, when the secondary battery is discharged, the negative electrode active material extracts lithium ions. Thus, the shape of the primary particles of the negative electrode active material can be shrunk. When the shape of the primary particles of the active material is repeatedly changed as described above, the conductive path between the primary particles is broken, the electrical conductivity decreases, and the internal resistance tends to increase.

Incidentally, examples of the method of improving the input-output performance of the secondary battery include use of an active material having a small particle size and a high specific surface area. When such an active material is used, the reaction area is increased and the internal resistance of the electrode is decreased. Accordingly, it is possible to improve the input-output performance of the secondary battery.

However, as the reaction area increases, the contact area between the active material and the electrolyte increases. Thus, the decomposition reaction of the electrolyte is likely to occur. Thus, when the negative electrode active material allows lithium ions to be inserted and the potential of the electrode is lowered, the decomposition reaction of solvent and the electrolyte salt in the electrolyte is likely to occur. The product resulting from this decomposition can deposit on the surface of the primary particles to form a coating layer. The main component of the coating layer is an organic substance. The coating layer has ion conductivity of lithium ions and the like, but tends not to have electrical conductivity. Therefore, when the coating layer is formed, the decomposition reaction of the electrolyte is less likely to occur. Meanwhile, the conductive path between the primary particles of the active material described above is broken and the electrical conductivity may be reduced.

When the conductive path between the primary particles is broken in this manner, the electrical conductivity in the electrode become uneven. Thus, the life performance of the secondary battery can be deteriorated. Therefore, it was difficult to achieve both excellent input-output performance and life performance of the secondary battery.

First Embodiment

According to the embodiment, an electrode is provided. The electrode includes an active material-containing layer. The active material-containing layer includes an active material and a conductive agent. The active material contains primary particles of a niobium-titanium composite oxide. The conductive agent contains fibrous carbon. The primary particles have an average particle size of 0.3 μm or more and 2 μm or less. At least a part of a surface of the primary particles is coated with the fibrous carbon. A covering ratio of the primary particles by the fibrous carbon is 0.01% or more and 40% or less.

The electrode according to the embodiment includes a plurality of primary particle-like active material particles having a relatively small average particle size. Further, in the electrode according to the embodiment, relatively small primary particles are coated with an appropriate amount of fibrous carbon. Since the fibrous carbon can be present between a plurality of primary particles, a stronger conductive path can be provided as compared with granular carbon. The conductive path by the fibrous carbon is less likely to be broken by deformation of primary particles due to charging and discharging or formation of a coating layer due to decomposition of the electrolyte. In the electrode according to the embodiment, an excellent conductive path by the fibrous carbon is sufficiently provided between the primary particles. Therefore, the electrode according to the embodiment is used, so that it is possible to achieve both the input-output performance and life performance of the secondary battery.

When the average particle size of the primary particles is smaller than 0.3 μm, the life performance of the secondary battery tends to be remarkably deteriorated. When the average particle size of the primary particles is larger than 2 μm, the input-output performance of the secondary battery cannot be sufficiently improved. The average particle size of the primary particles is preferably 0.4 μm or more and 1.3 μm or less, and more preferably 0.5 μm or more and 0.9 μm or less.

When the covering ratio (the coverage) is lower than 0.01%, the formation of the conductive path by fibrous carbon can be not sufficient. Thus, the input-output performance and life performance of the secondary battery tend to be deteriorated. When the coverage is higher than 40%, an excessive amount of the fibrous carbon can be present. Thus, it is difficult to increase the electrode density, thereby lowering the energy density of the secondary battery. The coverage is preferably 1% or more and 30% or less, and more preferably 5% or more and 20% or less.

In the electrode according to the embodiment, it is preferable that at least some of the primary particles are spaced apart from each other. The primary particles spaced apart from each other can form a pair of first and second particles. The first particle and the second particle are spaced apart from each other and are positioned closest to each other. It is preferable that an average value of nearest-neighbor distances between the first particle and the second particle (i.e., an average distance between the primary particles) is greater than 0 and 100 nm or less.

A conductive agent, a binder, an electrolyte, and a mixture thereof may be present in a gap between the first particle and the second particle. Preferably, the conductive agent is present in the gap. When the gap is provided, even if the volume change of the active material is caused by charging and discharging, or even when a coating layer is formed on the surface of the primary particles, it is possible to maintain the conductive path and it is also possible to suppress a decrease in the electrical conductivity of the electrode.

The average particle size of the primary particles can be obtained, for example, by the following method.

First, when the electrode is included in the secondary battery, the electrode is extracted by the following method. Here, a case in which the electrode is a negative electrode will be described by way of example. First, the secondary battery is set in a discharged state.

Specifically, the secondary battery is discharged to the discharge lower limit voltage at a current value of 0.2 C. or less in an environment of 25° C., thereby setting the secondary battery in the discharged state. The battery in the discharged state is placed in a glove box filled with argon gas. The negative electrode is extracted from the battery in the glove box. The extracted electrode is cleaned with an ethyl methyl ether solvent. An electrode sample is thus obtained.

Next, a part of the active material-containing layer of the electrode sample is subjected to section milling to expose a section. An ion milling device is used for section milling. The obtained section is analyzed with a scanning electron microscope equipped with an energy dispersive X-ray analyzer (Scanning Electron Microscope-Energy Dispersive X-ray spectrometry: SEM-EDX). According to the analysis, it is possible to know the shape of each of the components contained in the active material-containing layer and the composition of each of the components (each of elements B to U in the periodic table) contained in the active material-containing layer. As a result, in the analysis image, particles including niobium and titanium can be identified as active material particles.

Then, an SEM image of the section is obtained at a magnification of 10000. In the SEM image, the section of the primary particles is selected. Selection of a primary particle is explained with reference to FIG. 13. FIG. 13 is a schematic view showing a section of a primary particle of an active material. In FIG. 13, A and B are points that are present on the outline of a primary particle Q1 and are most distant from each other. In other words, a line segment AB is the longest portion in the section of the primary particle Q1. Conditions for selecting a primary particle are that a region including niobium and titanium is selected, that the length $L_{AB}$ of the line segment AB is shorter than 5 μm and equal to or longer than 0.3 μm, and that the entire outline of the section of the primary particle Q1 is visible. This is because the portion exceeding 5 μm and including niobium and titanium is considered to be a secondary particle formed from an aggregate of primary particles. Further, this is because the region where the longest portion is smaller than 0.3 μm and includes niobium and titanium is considered to be a fragment generated by crushing primary particles or the like. A further condition for selecting a primary particle is that a ratio of the length of a line segment CD to the length of the line segment AB (ratio $L_{CD}/L_{AB}$) is equal to or greater than 0.5 and equal to or smaller than 1. The line segment CD is a segment connecting C and D, which are intersections between a perpendicular bisector of the line segment AB and the outline of the primary particle Q1.

Then, the smallest circle inscribed in the selected particle is determined, and the diameter of this circle is defined as the particle size of the selected particle. In the SEM image, the same operation is performed on five primary particles to obtain an average value of particle sizes. The average value is calculated for twenty SEM images obtained at different places of the active material-containing layer. The average particle size of the primary particles is obtained by dividing the sum of the average values of the twenty SEM images thus obtained by 20.

FIG. 1 is an example of a scanning electron micrograph showing a section of the active material-containing layer. The SEM image shown in FIG. 1 is obtained at a magnification of 10000. As shown in FIG. 1, primary particles PP of the active material are included in the section of the active material-containing layer.

The coverage of the fibrous carbon on the surface of the primary particles can be obtained, for example, by the following method.

First, a section of an electrode sample is obtained by the same method as described above. Next, an SEM image of the section is obtained at a magnification of 50000. In the SEM image, primary particles whose surfaces are not cut are selected. A primary particle is selected in the same manner as described above; that is, conditions for selecting a primary particle is that a region including niobium and titanium is selected, that the length $L_{AB}$ of the line segment AB is shorter than 5 μm and equal to or longer than 0.3 μm, and the ratio $L_{CD}/L_{AB}$ is equal to or greater than 0.5 and equal to or smaller than 1.

Then, the smallest circle inscribed in the selected particle is determined, and the area of the smallest circle is calculated. The area of the smallest circle is defined as the area of the selected particle. In this SEM image, the same operation is performed on one particle to obtain an average value of the area of the particle. The average value is calculated for twenty SEM images obtained at different places of the active material-containing layer. An average area S0 of the primary particles is obtained by dividing the sum of the average values of the twenty SEM images thus obtained by 20.

Next, each of the SEM images is subjected to binarization processing. In the binarization processing, a threshold value is set so that the active material particles can be distinguished from the fibrous carbon present on the surface of the active material particles. The area of the fibrous carbon present on the surface of the primary particles is calculated from the image after binarization processing. The area of the fibrous carbon is calculated for twenty SEM images obtained at different places of the active material-containing layer. An average area S1 of the fibrous carbon is obtained by dividing the sum of the average values of the twenty SEM images thus obtained by 20.

The average area S1 of the fibrous carbon obtained by the above method is divided by the average area S0 of the primary particles so that it is possible to calculate the ratio of the fibrous carbon to the surface of the primary particles (i.e., the coverage (S1/S0×100)).

FIG. 2 is another example of a scanning electron micrograph showing a section of the active material-containing layer. The SEM image shown in FIG. 2 is obtained at a magnification of 50000. As shown in FIG. 2, the section of the active material-containing layer includes a primary particle PP1 which is a primary particle of the active material and whose surface is not cut, and a primary particle PP2 which is a primary particle of the active material and whose surface is cut. A fibrous carbon FC is deposited on the surface of the primary particle PP1.

The distance between the primary particles can be obtained, for example, by the following method.

First, a section of an electrode sample is obtained by the same method as described above. Next, an SEM image of the section is obtained at a magnification of 20000. In the SEM image, the primary particles are randomly selected. The selected particle is defined as a first particle. The primary particle which is spaced apart from and positioned closest to the first particle is selected. This selected particle is defined as a second particle. Thus, a pair of the first particle and the second particle is obtained. When selecting the first particle and the second particle, a primary particle is selected in the same manner as described above; that is, conditions for selecting a primary particle are that a region including niobium and titanium is selected, the length $L_{AB}$ of the line segment AB is shorter than 5 μm and equal to or longer than 0.3 μm, that the ratio $L_{CD}/L_{AB}$ is equal to or greater than 0.5 and equal to or smaller than 1, and that the entire outline of the section is visible in the SEM image. The nearest-neighbor distance between the outline of the first particle and the outline of the second particle is measured. The nearest-neighbor distance is defined as the distance between primary particles. In the SEM image, the same operation is performed on three pairs to obtain an average value of the distances between primary particles. The average value is calculated for twenty SEM images obtained at different places of the active material-containing layer. The average distance between primary particles is obtained by dividing the sum of the average values of the twenty SEM images thus obtained by 20.

FIG. 12 is a schematic view schematically showing a section of the active material-containing layer. FIG. 12 is a schematic view schematically showing an SEM image obtained at a magnification of 20000. In FIG. 12, a first particle P1 is surrounded by five primary particles. Among the five primary particles, two particles are present spaced apart from the first particle P1, and three particles are in contact with the outline of the first particle P1. The primary particle which is spaced apart from the first particle P1 and positioned closest to the first particle P1 is defined as a second particle P2. The primary particle which is spaced apart from the first particle P1 and positioned second closest to the first particle P1 is defined as a third particle P3. Three particles in contact with the first particle P1 are defined as a fourth particle P4, a fifth particle P5, and a sixth particle P6, respectively. The nearest-neighbor distance between the outline of the first particle P1 and the outline of the second particle P2 is defined as a distance between primary particles PD.

Note that, in the calculation of the average particle size of the primary particles, the coverage, and the average distance between primary particles, a section obtained at the center of the active material-containing layer is used as the section of the active material-containing layer. The center of the active material-containing layer is a portion positioned at the center in each of the thickness direction, the long side direction, and the short side direction of the active material-containing layer. In the center, for example, twenty sections are cut parallel to the thickness direction of the active material-containing layer at equal intervals along the long side direction of the active material-containing layer and used for measurement.

Subsequently, details of the electrode according to the embodiment will be described. The electrode according to the embodiment can include a current collector and an active material-containing layer.

(1) Current Collector

In the electrode according to the embodiment, it is preferable that the active material-containing layer is provided on the current collector. The active material-containing layer may be provided on one main surface of the current collector or may be provided on both main surfaces.

The current collector is a material which is electrochemically stable at the insertion and extraction potentials of lithium (Li) of the active material. For example, if the electrode is used as the negative electrode, the current collector is preferably made of copper, nickel, stainless, aluminum, or an aluminum alloy containing one or more elements selected from Mg, Ti, Zn, Mn, Fe, Cu, and Si. The thickness of the current collector is preferably 5 µm to 20 µm. The current collector having such a thickness can achieve a balance between the strength and reduction in weight of the electrode.

The current collector can include a portion on one side where the active material-containing layer is not carried on any surfaces. This portion acts as a current collector tab.

(2) Active Material-Containing Layer

The active material-containing layer includes an active material and a conductive agent. The active material-containing layer may include a binder.

(2-1) Active Material

The active material includes a niobium-titanium composite oxide. The crystal structure of the niobium-titanium composite oxide belongs to the monoclinic type, for example.

As the niobium-titanium composite oxide, a compound represented by $Li_aTi_{1-x}M1_xNb_{2-y}M2_yO_{7-\delta}$ can be used. Here, each of the element M1 and the element M2 is at least one element selected from the group consisting of Fe, Ni, W, Ta, and Mo. The element M1 and the element M2 may be the same or may be elements different from each other. The respective subscripts in the composition formula are specified as follows: $0 \leq a < 5$, $0 \leq x < 1$, $0 \leq y < 1$, and $-0.3 \leq \delta \leq 0.3$. Specific examples of the niobium-titanium composite oxide include $Li_xNb_2TiO_7$ ($0 \leq x \leq 5$).

As the niobium-titanium composite oxide, a compound represented by $Li_xTi_{1-y}M3_{y+z}Nb_{2-z}O_{7-\delta}$ may be used. Here, M3 is at least one element selected from Fe, Ni, W, Ta, and Mo. The respective subscripts in the composition formula are specified as follows: $0 \leq x < 5$, $0 \leq y < 1$, $0 \leq z \leq 2$, and $-0.3 \leq \delta \leq 0.3$.

Further, as the niobium-titanium composite oxide, a sodium-containing niobium-titanium composite oxide may be used. As the sodium-containing niobium-titanium composite oxide, a compound represented by $Li_{2+v}Na_{2-w}M4_xTi_{6-y-z}Nb_yM5_zO_{14+\delta}$ can be used. Here, the element M4 is at least one element selected from the group consisting of Cs, K, Sr, Ba, and Ca. The element M5 is at least one element selected from the group consisting of Zr, Sn, V, Ta, Mo, W, Fe, Mn, and Al. The respective subscripts in the composition formula are specified as follows: $0 \leq v \leq 4$, $0 < w < 2$, $0 \leq x < 2$, $0 < y \leq 6$, $0 \leq z < 3$, and $-0.5 \leq \delta \leq 0.5$.

As the niobium-titanium composite oxide, it is preferable to use a compound represented by $Li_aTi_{1-x}M1_xNb_{2-y}M2_yO_{7-\delta}$.

The active material may include a titanium composite oxide in addition to the niobium-titanium composite oxide. Examples of the titanium composite oxide include lithium titanate having a spinel structure, monoclinic β-type titanium composite oxide, anatase-type titanium oxide, rutile-type titanium oxide, and orthorhombic type titanium-containing composite oxide.

Examples of the orthorhombic titanium composite oxide includes a compound represented by a general formula of $Li_{2+a}M(I)_{2-b}Ti_{6-c}M(II)_dO_{14+\sigma}$. M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, $0 \leq a \leq 6$, $0 \leq b < 2$, $0 \leq c < 6$, $0 \leq d < 6$, $-0.5 \leq \delta \leq 0.5$. Specific examples of the orthorhombic titanium composite oxide include $Li_{2+a}Na_2Ti_6O_{14}$ ($0 \leq a \leq 6$).

The niobium-titanium composite oxide is in the form of particles. The niobium-titanium composite oxide may be a mixture of primary particles and secondary particles. The secondary particles each are formed from an aggregate of a plurality of primary particles. The secondary particles may have an indeterminate shape. In the active material-containing layer, it is preferable that the active material particles are dispersed as the primary particles. The active material particles are dispersed as the primary particles, so that the input-output performance of the secondary battery can be improved. Further, the shape of the secondary particles may collapse due to the volume change of the active material caused by charging and discharging. When the shape of the secondary particles is thus changed, the conductive path is broken and the input-output performance and life performance of the battery tend to be deteriorated.

In the active material-containing layer, the abundance of the primary particles is preferably higher than the abundance of the secondary particles. The abundance of the primary particles is preferably 60% or more, and more preferably 90% or more.

The abundance of the primary particles can be obtained, for example, by the following method.

First, an SEM image of the section of the active material-containing layer (at a magnification of 10000) is obtained by the same method as described above. An area A1 of the section of all the primary particles that can be confirmed by the SEM image is calculated. The section of the primary particles is a region which includes niobium and titanium, does not include a portion exceeding 5 µm and a region where the longest portion is smaller than 0.3 µm, and the entire outline of the section is visible in the SEM image. Then, an area A2 of the section of all the secondary particles that can be confirmed by the SEM image is calculated. The section of the secondary particles is a region which includes niobium and titanium, and a portion exceeding 5 µm. A ratio A1/A3 of the area A1 of the primary particles to a sum A3 of the area A1 of the section of the primary particles and the area A2 of the section of the secondary particles is defined as the abundance of the primary particles in the SEM image. Further, a ratio A2/A3 of the area A2 of the secondary particles to the sum A3 of the area A1 of the section of the primary particles and the area A2 of the section of the secondary particles is defined as the abundance of the secondary particles in the SEM image. The abundance of the primary particles is calculated for twenty SEM images obtained at different places of the active material-containing layer. The sum of the resulting abundances of the primary particles in the twenty SEM images is divided by 20 and the obtained average value is defined as the abundance of the primary particles.

(2-2) Conductive Agent

The conductive agent contains fibrous carbon. At least part of the surface of the primary particles is coated with fibrous carbon. The fibrous carbon mainly enhances the electrical conductivity between the primary particles.

The aspect ratio of the fibrous carbon (i.e., a ratio L/S of a long axis L to a short axis S) is 50 or more. The aspect ratio of the fibrous carbon is preferably 100 or more. The fiber diameter of the fibrous carbon (i.e., the diameter of the section perpendicular to the direction of elongation of the fibrous carbon) is preferably 1 nm or more and 50 nm or less. When the fiber diameter of the fibrous carbon is within this range, it is possible to provide a good conductive path between the primary particles. It is more preferable that the fiber diameter of the fibrous carbon is 5 nm or more and 40 nm or less. Further, the length of the fibrous carbon (i.e., the length of the fibrous carbon in the direction parallel to the elongation direction) is preferably 10 μm or more and 100 μm or less, and more preferably 20 μm or more and 75 μm or less. The fiber diameter of the fibrous carbon can be calculated from an SEM image of the section of the active material-containing layer (at a magnification of 50000).

As the fibrous carbon, a carbon nanotube is preferably used. As the carbon nanotube, a multi-walled carbon nanotube may be used, or a single-walled carbon nanotube may be used. As the carbon nanotube, the multi-walled carbon nanotube is preferably used.

Preferably, the conductive agent further contains granular carbon. The aspect ratio of the granular carbon (i.e., the ratio L/S of the long axis L to the short axis S) is lower than 50. The granular carbon is further added to the active material-containing layer, so that it is possible to enhance the electrical conductivity between the active material particles and the electrical conductivity between the active material particles and the current collector. As the granular carbon, carbonaceous substances such as acetylene black, carbon black, graphite, and graphene can be used. As the granular carbon, carbon black is preferably used.

The average particle size of the granular carbon is preferably 10 nm or more and 300 nm or less. When the average particle size of the granular carbon is within this range, the input-output performance and life performance of the secondary battery tend to be high. The average particle size of the granular carbon can be calculated from, for example, an SEM image of the section of the active material-containing layer (at a magnification of 50000). The granular carbon more preferably has an average particle size of 50 nm or more and 200 nm or less.

In the active material-containing layer, the blending amount of the conductive agent is, for example, 1 part by mass or more and 5 parts by mass or less with respect to 100 parts by mass of the active material. In the electrode according to the embodiment, the active material particles are satisfactorily coated with the fibrous carbon, and thus the blending amount of the conductive agent can be relatively reduced. Since the conductive agent has a low bulk density, the density of the active material-containing layer can be increased by reducing the blending amount of the conductive agent. The blending amount of the conductive agent is preferably 2 parts by mass or more and 4 parts by mass or less with respect to 100 parts by mass of the active material.

In the active material-containing layer, the blending amount of the fibrous carbon is preferably 0.01 part by mass or more and 3 parts by mass or less, and more preferably 0.1 part by mass or more and 2 parts by mass or less with respect to 100 parts by mass of the active material.

In the active material-containing layer, the blending amount of the granular carbon is preferably 1 part by mass or more and 5 parts by mass or less, and more preferably 1.5 parts by mass or more and 4 parts by mass or less with respect to 100 parts by mass of the active material. The blending amount of the granular carbon may be greater than or equal to the blending amount of the fibrous carbon.

(2-3) Binder

The binder has an effect of binding the active material, the conductive agent, and the current collector. Examples of the binder include polytetrafluoroethylene (PTFE), polyvinylidene fluoride (PVdF), fluorine rubber, carboxymethyl cellulose (CMC), hydroxypropyl methylcellulose, hydroxyethyl methylcellulose, polyvinyl pyrrolidone, styrene-butadiene rubber, polyimide, polyamide imide, an acrylic resin or a copolymer thereof, polyacrylic acid, and polyacrylonitrile.

The binder preferably contains two types of binders: a first binder and a second binder. The first binder includes at least one compound selected from the group consisting of carboxymethyl cellulose, hydroxypropyl methylcellulose, hydroxyethyl methylcellulose, and polyvinyl pyrrolidone. The second binder includes at least one compound selected from the group consisting of styrene-butadiene rubber, polyvinylidene fluoride, polyimide, polyamide imide, polyacrylic acid, and polyacrylonitrile.

The first binder improves the dispersibility of the active material particles and the fibrous carbon in the active material-containing layer. The first binder is easily adsorbed on the surface of the niobium-titanium composite oxide, and thus the surface of the primary particles can be coated relatively uniformly. This is probably because the functional group present on the surface of the niobium-titanium composite oxide and the functional group contained in the first binder are likely to react. When the surface of the primary particles is coated with the first binder, the adhesion between the fibrous carbon and the primary particles increases. Thus, the coverage tends to increase. Further, when the surface of the primary particles is coated with the first binder, the decomposition reaction of the electrolyte can be suppressed. Therefore, the first binder is blended, so that the input-output performance and life performance of the secondary battery can be improved.

The second binder enhances the adhesion between the active material particles, the adhesion between the active material particles and the conductive agent, and the adhesion between the active material particles and the current collector. The strength of the electrode is increased by blending the second binder, so that it is possible to improve the life performance of the battery.

The second binder is preferably selected in accordance with the solvent of the slurry for electrode production to be described later. The dispersibility of the active material, the conductive agent, and the binder in the active material-containing layer is increased by using a binder having high solubility or dispersibility in the solvent of the slurry for electrode production. Thus, it is possible to obtain an active material-containing layer in which the active material, the conductive agent, and the binder are relatively uniformly mixed.

When an organic solvent such as N-methylpyrrolidone is used as the solvent of the slurry for electrode production, at least one compound selected from the group consisting of polyvinylidene fluoride, polyacrylonitrile, polyacrylic acid, and styrene-butadiene rubber is preferably used as the binder. Further, when water is used as the solvent of the slurry for electrode production, it is preferable to use at least one of polyacrylonitrile and styrene-butadiene rubber.

In the active material-containing layer, the blending amount of the binder is preferably 2 parts by mass or more and 28 parts by mass or less with respect to 100 parts by mass of the active material, for example. The blending amount of the binder is within this range, so that the input-output performance and life performance of the battery can be improved. The blending amount of the binder is more preferably 2 parts by mass or more and 4 parts by mass or less with respect to 100 parts by mass of the active material.

In the active material-containing layer, the blending amount of the first binder is preferably the same as the blending amount of the second binder. When the blending amount of the first binder is equal to the blending amount of the second binder, the dispersibility of the components contained in the active material-containing layer (such as the active material particles) is increased. Accordingly, it is possible to obtain an active material-containing layer in which these components are relatively uniformly dispersed and it is possible to sufficiently increase the strength of the electrode.

In the active material-containing layer, the blending amount of the first binder is preferably 1 part by mass or more and 5 parts by mass or less, and more preferably 1.5 parts by mass or more and 2 parts by mass or less with respect to 100 parts by mass of the active material. Further, in the active material-containing layer, the blending amount of the second binder is preferably 1 part by mass or more and 5 parts by mass or less, and more preferably 1.5 parts by mass or more and 2 parts by mass or less with respect to 100 parts by mass of the active material.

(3) Production Method

The method of producing the electrodes according to the embodiment can include: dispersing fibrous carbon in a solvent to obtain a fibrous carbon dispersion; adding a primary particle-like active material to the fibrous carbon dispersion to obtain a first mixture; performing a dispersion treatment of the first mixture; adding granular carbon to the first mixture after dispersion treatment to obtain a second mixture; performing a dispersion treatment of the second mixture; adding a first binder to the second mixture after dispersion treatment to obtain a third mixture; performing a dispersion treatment of the third mixture; adding a second binder to the third mixture after dispersion treatment to obtain a fourth mixture; and performing a dispersion treatment of the fourth mixture. The step of adding granular carbon to the first mixture may be omitted. Further, the first binder and the second binder may be added at the same time, and the addition of one of the first and second binders may be omitted.

In the method, since the primary particles of the active material and the fibrous carbon are first mixed, it is possible to allow the surface of the primary particles of the active material to carry the fibrous carbon. This makes it possible to provide a strong conductive path of the fibrous carbon between the primary particles of the active material in the active material-containing layer.

Then, the primary particles carrying fibrous carbon are mixed with the granular carbon, so that it is possible to allow the granular carbon to be arranged on the surface of the primary particles carrying fibrous carbon. Thus, the electrical conductivity of the active material-containing layer can be further enhanced.

Then, the primary particles coated with the fibrous carbon and the granular carbon are mixed with the first binder, whereby at least a portion of a surface of the primary particle of the active material which is not coated with the fibrous carbon and the spherical carbon is coated with the first binder. Accordingly, in the active material-containing layer, the reactivity between the primary particles of the active material and the electrolyte can be reduced. Further, the adhesion between the fibrous carbon and the primary particles and between the granular carbon and the primary particles can be enhanced.

Therefore, according to the above method, it is possible to obtain an electrode excellent in input-output performance and life performance.

Subsequently, this method will be described in detail.

First, a fibrous carbon powder is dispersed in a solvent to prepare a fibrous carbon dispersion. As the solvent, an organic solvent such as N-methylpyrrolidone or water can be used. The content of fibrous carbon in the fibrous carbon dispersion is, for example, 0.1 mass % or more and 7.0 mass % or less.

Then, a powder of an active material such as a niobium-titanium composite oxide is mixed with the fibrous carbon dispersion to obtain a first mixture. As the active material powder, it is preferable to use an active material powder having an average particle size of 0.3 µm or more and 2 µm or less. In the case of using an active material powder having an average particle size of greater than 2 µm or an active material powder containing granulated secondary particles, it is preferable to perform sufficient dispersion treatment to crush the secondary particles. The first mixture is stirred using a kneader such as a planetary mixer to obtain a first mixture after dispersion treatment.

Then, a powder of granular carbon is added to the first mixture after dispersion treatment to obtain a second mixture. The second mixture is stirred using a kneader such as a planetary mixer to obtain a second mixture after dispersion treatment. Note that this step may be omitted.

Then, the first binder is added to the second mixture after dispersion treatment to obtain a third mixture. The third mixture is stirred using a pulverizer such as a bead milling machine to obtain a third mixture after dispersion treatment. The first binder is preferably added as a first binder solution dissolved in a solvent. As the solvent, for example, an organic solvent such as N-methylpyrrolidone or water is used. The content of the first binder in the first binder solution is, for example, 1 mass % or more and 10 mass % or less.

The second binder is added to the third mixture after dispersion treatment to obtain a fourth mixture. The fourth mixture is stirred using a pulverizer such as a bead milling machine to obtain a fourth mixture after dispersion treatment. The second binder is preferably added as a second binder dispersion dispersed in a solvent. As the solvent, an organic solvent such as N-methylpyrrolidone or water can be used. The content of the second binder in the second binder dispersion is, for example, 1 mass % or more and 10 mass % or less. Incidentally, the first binder and the second binder may be added at the same time, and the addition of one of the first and second binders may be omitted.

Then, as an electrode slurry, the fourth mixture after dispersion treatment is applied to one side or both sides of the current collector. The applied electrode slurry is dried to form a laminated body of the active material-containing layer and the current collector. This laminated body is pressed to obtain an electrode.

Alternatively, the electrode may also be produced by the following method. First, the electrode slurry is formed into a pellet shape. Then, the electrode can be obtained by arranging the pellets on the current collector.

The electrode according to the embodiment described above includes primary particles having an average particle size of 0.3 µm or more and 2 µm or less, and the surface of the primary particles is coated with fibrous carbon at a coverage of 0.1% or more and 40% or less. Therefore, the electrode according to the embodiment is used, so that it is possible to improve the input-output performance and life performance of the secondary battery.

Second Embodiment

According to the embodiment, a secondary battery including a negative electrode, a positive electrode and an electrolyte is provided. The secondary battery includes the electrode according to the embodiment as the negative electrode.

The secondary battery according to the embodiment can further include a separator disposed between the positive electrode and the negative electrode. The positive electrode, the negative electrode, and the separator can constitute an electrode group. The electrolyte may be held in the electrode group.

The secondary battery according to the embodiment can further include a container member housing the electrode group and the electrolyte.

Furthermore, the secondary battery according to the embodiment can further include a positive electrode terminal electrically connected to the positive electrode and a negative electrode terminal electrically connected to the negative electrode.

The secondary battery according to the embodiment may be a lithium secondary battery. The secondary battery includes nonaqueous electrolyte secondary battery containing a nonaqueous electrolyte.

Hereinafter, the negative electrode, the positive electrode, the electrolyte, the separator, the container member, the positive electrode terminal, and the negative electrode terminal will be described in detail.

1) Negative Electrode

The negative electrode can include a negative electrode current collector and a negative electrode active material-containing layer. The negative electrode current collector and the negative electrode active material-containing layer can be the current collector and the active material-containing layer described concerning the electrode according to the embodiment, respectively.

Details of negative electrode overlapping with the details of negative electrode described in first embodiment are omitted.

The density of the negative electrode active material-containing layer (excluding the current collector) preferably ranges from 2.3 g/cm³ to 3.0 g/cm³. A negative electrode in which the density of the negative electrode active material-containing layer falls within this range is excellent in the energy density and the retention property of an electrolyte. The density of the active material-containing layer more preferably ranges from 2.5 g/cm³ to 2.9 g/cm³.

The negative electrode can be produced in accordance with, for example, the same procedure as that of the electrode according to the first embodiment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide may be used. The positive electrode may include one kind of positive electrode active material, or alternatively, include two or more kinds of positive electrode active materials. Examples of the oxide include compounds capable of having Li or Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-x}Co_yMn_zO_2$; $0<x\leq1$, $0<y<1$, $0<z<1$, $y+z<1$).

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithuium iron phosphates (e.g., $Li_xFePO_4$; $0<x\leq1$), and lithium nickel cobalt manganese composite oxides($Li_xNi_{1-y-z}Co_yMn_zO_2$; $0<x\leq1$, $0<y<1$, $0<z<1$, $y+z<1$). The positive electrode potential can be made high by using these positive electrode active materials.

When an room temperature molten salt is used as the nonaqueous electrolyte of the battery, preferred examples of the positive electrode active material include lithium iron phosphate, $Li_xVPO_4F$ ($0\leq x\leq1$), lithium maganese composite oxide, lithium nickel composite oxide, and lithium nickel cobalt composite oxide. Since these compounds have low reactivity with room temperature molten salts, cycle life can be improved. The room temperature molten salt will be described later in detail.

The primary particle size of the positive electrode active material is preferably within a range of from 100 nm to 3 µm. The positive electrode active material having a primary particle size of 100 nm or more is easy to handle during industrial production. In the positive electrode active material having a primary particle size of 3 µm or less, diffusion of lithium ions within solid can proceed smoothly.

The specific surface area of the positive electrode active material is preferably within a range of from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of the CMC. One of these may be used as the binder, or two or more may be used in combination as the binder.

The conductive agent is added to improve a current collection performance and to suppress the contact resistance between the active material and the current collector. Examples of the conductive agent include vapor grown carbon fiber (VGCF), carbon black such as acetylene black, and carbonaceous substances such as graphite. One of these may be used as the conductive agent, or two or more may be used in combination as the conductive agent. The conductive agent may be omitted.

In the positive electrode active material-containing layer, the positive electrode active material and binder are preferably blended in proportions within ranges of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When a conductive agent is added, the positive electrode active material, binder, and conductive agent are preferably blended in proportions of 77% by mass to 95% by mass, 2% by mass to 20% by mass, and 3% by mass to 15% by mass, respectively.

When the amount of the conductive agent is 3% by mass or more, the above-described effects can be expressed. By setting the amount of the conductive agent to 15% by mass or less, the proportion of conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector can include a portion on one side where the positive electrode active material-containing layer is not carried on any surfaces. This portion acts as a positive electrode current collector tab.

The positive electrode can be produced in accordance with, for example, the same procedure as that of the electrode according to the embodiment.

3) Electrolyte

As the electrolyte, for example, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN(CF_3SO_2)_2$), and mixtures thereof. The electrolyte salt is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GEL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, a room temperature molten salt (ionic melt) including lithium ions, a polymer solid electrolyte, or an inorganic solid electrolyte, other than the liquid nonaqueous electrolyte or the gel nonaqueous electrolyte.

The room temperature molten salt (ionic melt) means compounds which may exist in a liquid state at normal temperature (15 to 25° C.) among organic salts constituted of combinations of organic cations and anions. The room temperature molten salts include those which singly exist in a liquid state, those which are put into a liquid state when mixed with an electrolyte, those which are put into a liquid state when dissolved in an organic solvent, and mixture thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in a polymeric material, and solidifying it.

The inorganic solid electrolyte is a solid substance having lithium ion conductivity.

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current. Further, an inorganic substance such as an oxide may be applied onto the porous film.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can be properly selected depending on battery size or intended use of the battery.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 4.5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be more specifically described with reference to the drawings.

Figure 4:
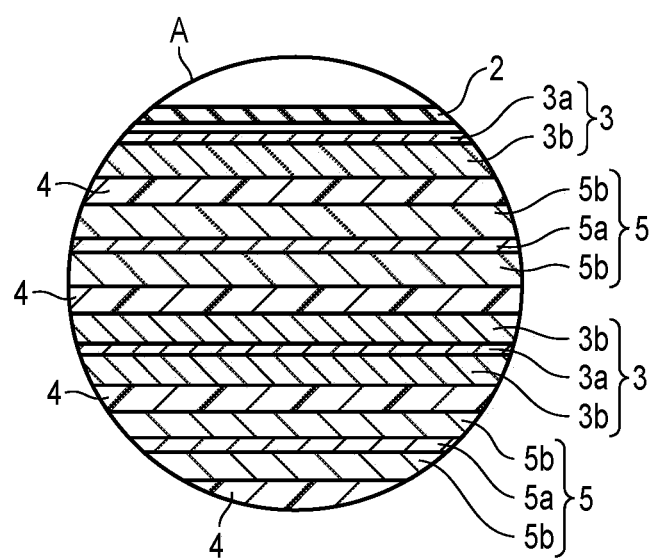
FIG. 4 is an enlarged cross-sectional view of section A of the secondary battery shown in FIG. 3.

FIG. 3 is a cross-sectional view schematically showing an example of a secondary battery according to the embodiment. FIG. 4 is an enlarged cross-sectional view of section A of the secondary battery shown in FIG. 3.

The secondary battery 100 shown in FIGS. 3 and 4 includes a bag-shaped container member 2 shown in FIG. 3, an electrode group 1 shown in. FIGS. 3 and 4, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 3, the electrode group 1 is a wound electrode group in a flat form. The wound electrode group 1 in a flat form includes a negative electrode 3, a separator 4, and a positive electrode 5, as shown in FIG. 4. The separator 4 is sandwiched between the negative electrode 3 and the positive electrode 5.

The negative electrode 3 includes a negative electrode current collector 3a and a negative electrode active material-containing layer 3b. The active material is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 3, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

Figure 5:
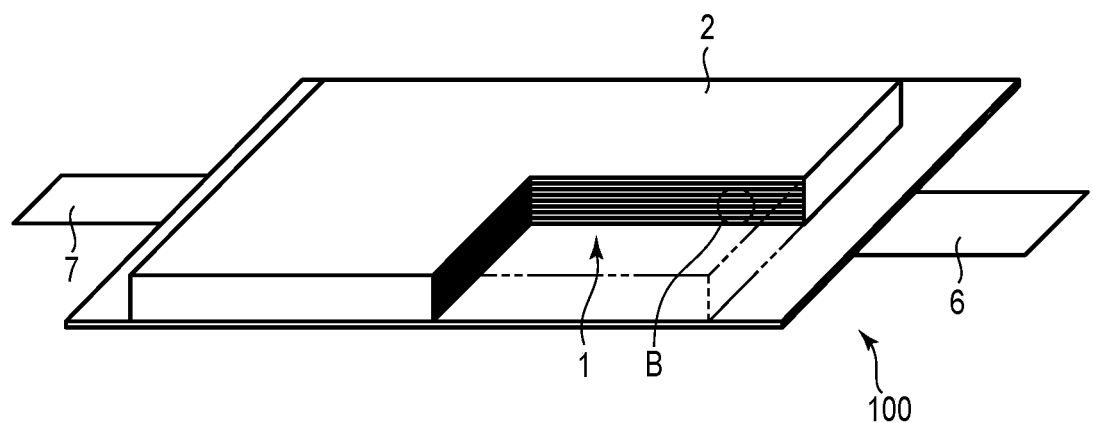
FIG. 5 is a partially cut-out perspective view schematically showing another example of a secondary battery according to the embodiment.
Figure 6:
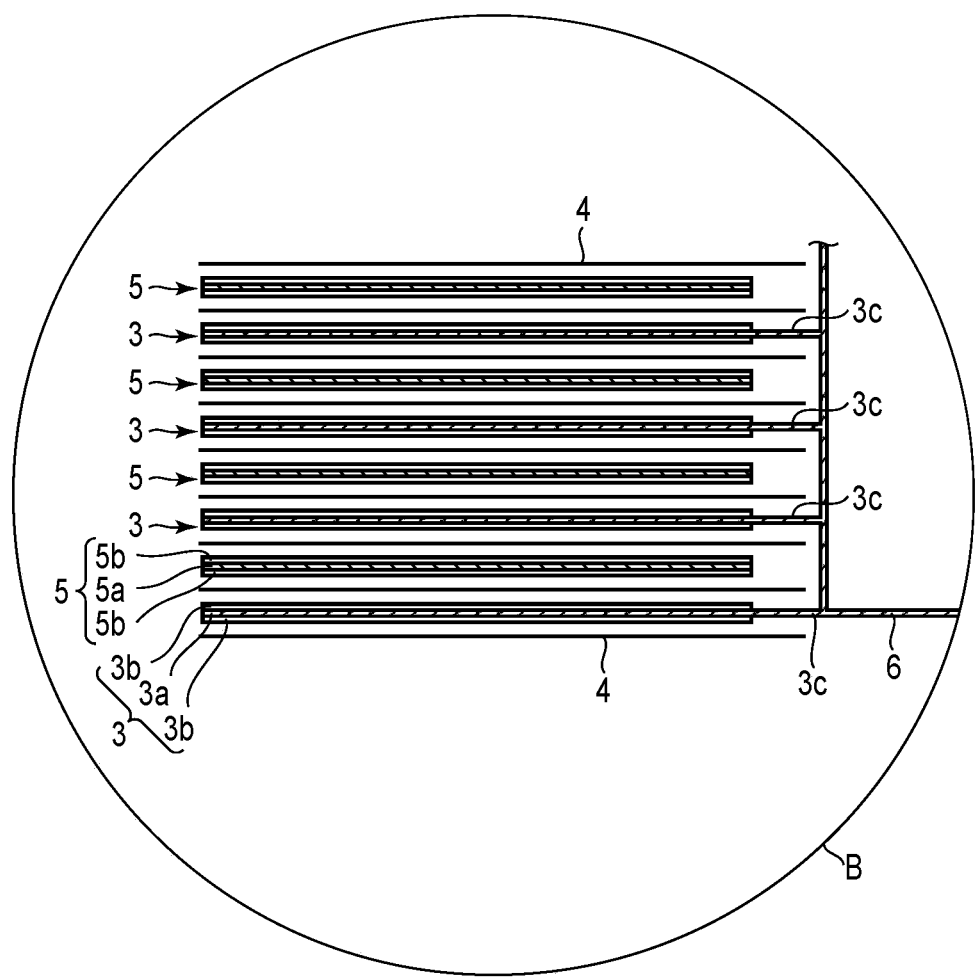
FIG. 6 is an enlarged cross-sectional view of section B of the secondary battery shown in FIG. 5.

The secondary battery according to the embodiment is not limited to the secondary battery of the structure shown in FIGS. 3 and 4, and may be, for example, a battery of a structure as shown in FIGS. 5 and 6.

FIG. 5 is a partially cut-out perspective view schematically showing another example of a secondary battery according to the embodiment. FIG. 6 is an enlarged cross-sectional view of section B of the secondary battery shown in FIG. 5.

The secondary battery 100 shown in FIGS. 5 and 6 includes an electrode group 1 shown in FIGS. 5 and 6, a container member 2 shown in FIG. 5, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 6, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 6, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the embodiment includes the electrode according to the embodiment. For this reason, the secondary battery according to the embodiment can implement excellent input-output performance and life performance.

Third Embodiment

According to an embodiment, a battery module is provided. The battery module according to the embodiment includes plural secondary batteries according to the embodiment.

In the battery module according to the embodiment, each of the single batteries may be arranged electrically connected in series, in parallel, or in a combination of in-series connection and in-parallel connection.

An example of the battery module according to the embodiment will be described next with reference to the drawings.

Figure 7:
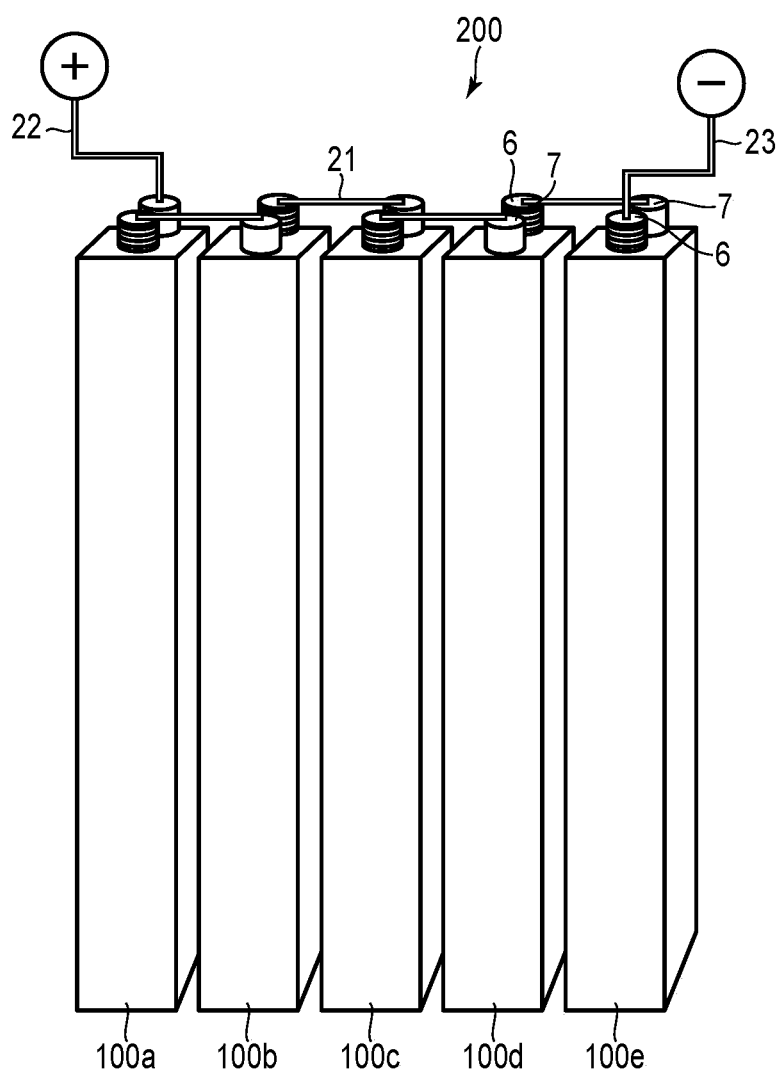
FIG. 7 is a perspective view schematically showing an example of the battery module according to the embodiment.

FIG. 7 is a perspective view schematically showing an example of the battery module according to the embodiment. A battery module 200 shown in FIG. 7 includes five single-batteries 100a to 100e, four bus bars 21, a positive electrode-side lead 22, and a negative electrode-side lead 23. Each of the five single-batteries 100a to 100e is a secondary battery according to the embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 7 is a battery module of five in-series connection.

As shown in FIG. 7, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the embodiment includes the secondary battery according to the embodiment. Hence, the battery module according to the embodiment can implement excellent input-output performance and life performance.

Fourth Embodiment

According to an embodiment, a battery pack is provided. The battery pack includes a battery module according to the embodiment. The battery pack may include a single secondary battery according to the embodiment, in place of the battery module according to the embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the embodiment will be described with reference to the drawings.

Figure 9:
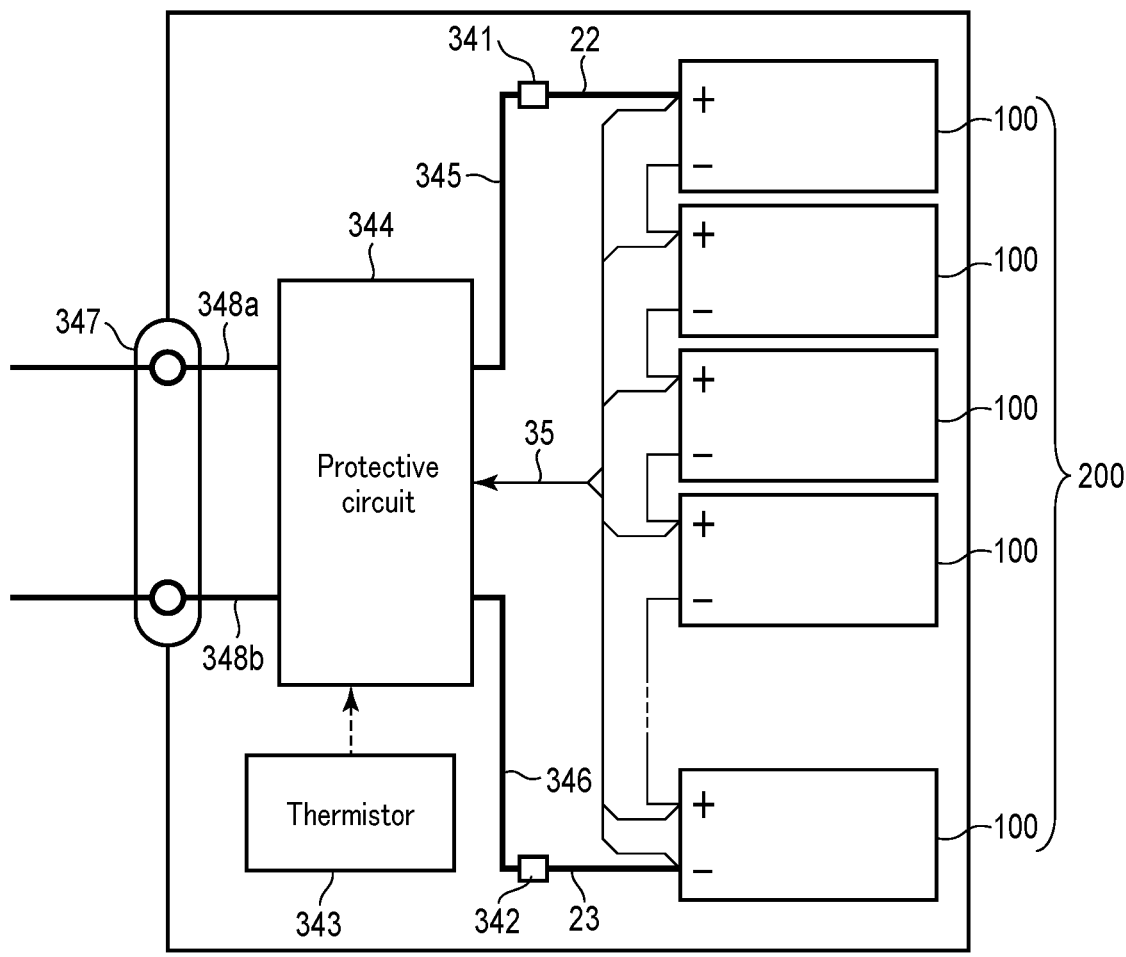
FIG. 9 is a block diagram showing an example of an electric circuit of the battery pack shown in FIG. 8.

FIG. 8 is an exploded perspective view schematically showing an example of the battery pack according to the embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

A single-battery 100 has a structure shown in FIGS. 3 and 4. At least one of the plural single-batteries 100 is a secondary battery according to the embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345.

The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the embodiment includes the secondary battery according to the embodiment or the battery module according to the embodiment. Hence, the battery pack according to the fourth embodiment can implement excellent input-output performance and life performance.

Fifth Embodiment

According to an embodiment, a vehicle is provided. The battery pack according to the embodiment is installed on this vehicle.

In the vehicle according to the embodiment, the battery pack is configured, for example, to recover regenerative energy from motive force of the vehicle. The vehicle according to the fifth embodiment can include a mechanism configured to convert kinetic energy of the vehicle into regenerative energy.

Examples of the vehicle according to the embodiment include two- to four-wheeled hybrid electric automobiles, two- to four-wheeled electric automobiles, electric assist bicycles, and railway cars.

In the vehicle according to the embodiment, the installing position of the battery pack is not particularly limited. For example, the battery pack may be installed in the engine compartment of the vehicle, in rear parts of the vehicle, or under seats.

The vehicle according to the fifth embodiment may include plural battery packs. In such a case, the battery packs may be connected to each other in series or in parallel. The connection may be a combination of the connection in series and the connection in parallel.

An example of the vehicle according to the embodiment is explained below, with reference to the drawings.

Figure 10:
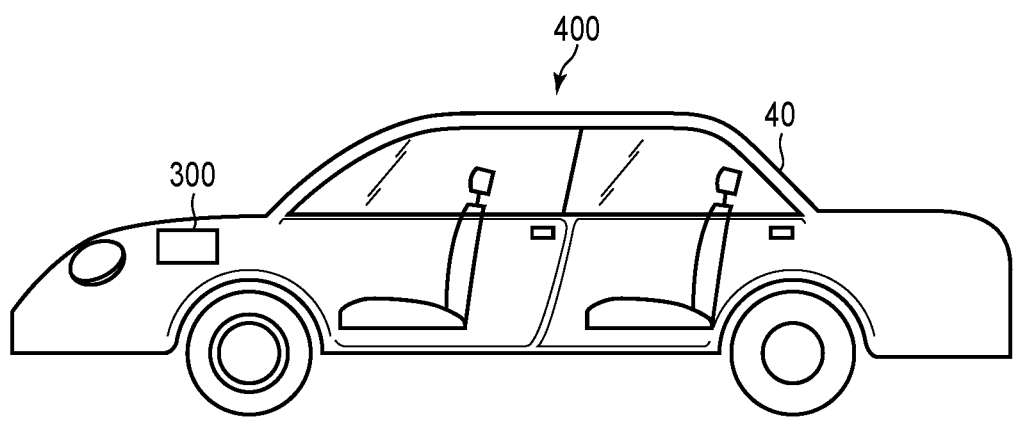
FIG. 10 is a cross-sectional view schematically showing an example of a vehicle according to the embodiment.

FIG. 10 is a cross-sectional view schematically showing an example of a vehicle according to the embodiment.

A vehicle 400, shown in FIG. 10 includes a vehicle body 40 and a battery pack 300 according to the embodiment. In FIG. 10, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 10, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Next, with reference to FIG. 11, an aspect of operation of the vehicle according to the embodiment is explained.

FIG. 11 is a view schematically showing another example of the vehicle according to the embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the embodiment includes the battery pack according to the embodiment. Hence, the vehicle according to the embodiment can implement excellent input-output performance and reliability.

EXAMPLES

Although examples will be described below, the present invention is not limited to the examples described below as long as the gist of the present invention is not exceeded.

Example 1

First, fibrous carbon was dispersed in water to prepare a fibrous carbon dispersion. As the fibrous carbon, a multi-walled carbon nanotube was used. The multi-walled carbon nanotube had a fiber diameter of 10 nm and a length of 20 μm.

Next, primary particle-like active material particles were added to the fibrous carbon dispersion to obtain a first mixture. As the active material, a monoclinic niobium-titanium composite oxide (NTO-1) was used. The composition of NTO-1 was $TiNb_2O_7$. In the first mixture, the blending amount of fibrous carbon with respect to 100 parts by mass of the active material was 1 part by mass. The first mixture was stirred using a planetary mixer to obtain a first mixture after dispersion treatment.

Then, the granular carbon was added to the first mixture after dispersion treatment to obtain a second mixture. The blending amount of the granular carbon was 2 parts by mass with respect to 100 parts by mass of the active material. As the granular carbon, acetylene black having an average particle size of 50 nm was used. The second mixture was stirred using a planetary mixer to obtain a second mixture after dispersion treatment.

Then, a first binder solution was added to the second mixture after dispersion treatment to obtain a third mixture. As the first binder solution, one obtained by dissolving carboxymethyl cellulose (CMC) in water was used. The first binder solution was added so that the blending amount of the first binder with respect to 100 parts by mass of the active material was 1.5 parts by mass. The third mixture was stirred using a bead mill to obtain a third mixture after dispersion treatment.

Then, a second binder dispersion was added to the third mixture after dispersion treatment to obtain a fourth mixture. As the second binder dispersion, one obtained by dispersing styrene-butadiene rubber (SBR) in water was used. The second binder dispersion was added so that the blending amount of the second binder with respect to 100 parts by mass of the active material was 1.5 parts by mass. The fourth mixture was stirred using a bead mill to obtain a fourth mixture after dispersion treatment.

The fourth mixture after dispersion treatment was then applied to both sides of an aluminum foil. The amount of the fourth mixture to be applied was 100 $g/m^2$. The applied fourth mixture was dried, and then the dried fourth mixture was pressed to obtain an electrode including an active material-containing layer. The density of the active material-containing layer was 2.7 $cm^3/g$.

Example 2

An electrode was produced in the same manner as in Example 1 except that hydroxypropylmethyl cellulose (HPMC) was used as the first binder in place of CMC.

Example 3

An electrode was produced in the same manner as in Example 1 except that hydroxyethylmethyl cellulose (HEMC) was used as the first binder in place of CMC.

Example 4

An electrode was produced in the same manner as in Example 1 except that polyvinyl pyrrolidone (PVP) was used as the first binder in place of CMC.

Example 5

An electrode was produced in the same manner as in Example 1 except that a monoclinic niobium-titanium composite oxide (NTO-2) having a larger average primary particle size than that of NTO-1 was used as the active material in place of NTO-1.

Example 6

An electrode was produced in the same manner as in Example 1 except that a monoclinic niobium-titanium composite oxide (NTO-3) having a larger average primary particle size than that of NTO-1 was used as the active material in place of NTO-1.

Example 7

An electrode was produced in the same manner as in Example 1 except that a monoclinic niobium-titanium composite oxide (NTO-4) having an average primary particle size smaller than that of NTO-1 was used as the active material in place of NTO-1.

Example 8

An electrode was produced in the same manner as in Example 1 except that N-methylpyrrolidone (NMP) was used as the solvent of the fibrous carbon dispersion in place of water, the blending amount of the fibrous carbon with respect to 100 parts by mass of the active material was changed from 1 part by mass to 2 parts by mass, NMP was used as the solvent of the first binder solution in place of water, the dispersion obtained by dispersing polyvinylidene fluoride (PVdF) in NMP was used as the second binder dispersion in place of the dispersion obtained by dispersing SBR in water, the blending amount of the first binder with respect to 100 parts by mass of the active material was changed from 1.5 parts by mass to 2 parts by mass, and the blending amount of the second binder with respect to 100 parts by mass of the active material was changed from 1.5 parts by mass to 2 parts by mass.

Example 9

An electrode was produced in the same manner as in Example 8 except that the blending amount of the fibrous carbon with respect to 100 parts by mass of the active material was changed from 2 parts by mass to 1.5 parts by mass, the blending amount of the granular carbon with respect to 100 parts by mass of the active material was changed from 2 parts by mass to 1.5 parts by mass, HPMC was used as the first binder in place of CMC, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass.

Example 10

An electrode was produced in the same manner as in Example 8 except that NTO-2 was used as the active material in place of NTO-1, the blending amount of the fibrous carbon with respect to 100 parts by mass of the active material was changed from 2 parts by mass to 0.1 part by mass, HEMC was used as the first binder in place of CMC, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass.

Example 11

An electrode was produced in the same manner as in Example 8 except that a monoclinic niobium-titanium composite oxide (NTO-5) having an average primary particle size smaller than that of NTO-1 was used as the active material in place of NTO-1, the blending amount of the fibrous carbon with respect to 100 parts by mass of the active material was changed from 2 parts by mass to 0.04 part by mass, the blending amount of the granular carbon with respect to 100 parts by mass of the active material was changed from 2 parts by mass to 4 parts by mass, HEMC was used as the first binder in place of CMC, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass.

Example 12

An electrode was produced in the same manner as in Example 8 except that the blending amount of the fibrous carbon with respect to 100 parts by mass of the active material was changed from 2 parts by mass to 0.2 part by mass, polyacrylonitrile (PAN) was used as the second binder in place of PVdF, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass.

Example 13

An electrode was produced in the same manner as in Example 8 except that a monoclinic niobium-titanium composite oxide (NTO-6) having an average primary particle size larger than that of NTO-1 was used as the active material in place of NTO-1, the blending amount of the fibrous carbon with respect to 100 parts by mass of the active material was changed from 2 parts by mass to 0.5 part by mass, polyacrylic acid (PAA) was used as the second binder in place of PVdF, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass.

Example 14

An electrode was produced in the same manner as in Example 8 except that primary particle-like orthorhombic sodium-containing niobium-titanium composite oxide (LNT-1) was used as the active material in place of NTO-1, the blending amount of the fibrous carbon with respect to 100 parts by mass of the active material was changed from 2 parts by mass to 1 part by mass, the blending amount of the first binder with respect to 100 parts by mass of the active material was changed from 2 parts by mass to 1.5 parts by mass, and the blending amount of the second binder with respect to 100 parts by mass of the active material was changed from 2 parts by mass to 1.5 parts by mass. The composition formula of LNT-1 was $Li_2Na_{1.7}Ti_{5.7}Nb_{0.3}O_{14}$.

Example 15

An electrode was produced in the same manner as in Example 14 except that a mixture of NTO-1 and titanium composite oxide (LTO-1) was used as the active material in place of LNT-1. In the mixture, the mass ratio of NTO-1 and LTO-1 was 9:1. The composition formula of LTO-1 was $Li_4Ti_5O_{12}$.

Example 16

An electrode was produced in the same manner as in Example 14 except that a mixture of NTO-1 and LNT-1 was used as the active material in place of LNT-1. In the mixture, the mass ratio of NTO-1 and LNT-1 was 8:1.

Comparative Example 1

An electrode was produced in the same manner as in Example 1 except that a monoclinic niobium-titanium composite oxide (NTO-7) having an average primary particle size larger than that of NTO-1 was used as the active material in place of NTO-1.

Comparative Example 2

An electrode was produced in the same manner as in Example 8 except that a monoclinic niobium-titanium composite oxide (NTO-8) having an average primary particle size smaller than that of NTO-1 was used as the active material in place of NTO-1.

Comparative Example 3

An electrode was produced in the same manner as in Example 1 except that NTO-2 was used as the active material in place of NTO-1 and the blending amount of the fibrous carbon with respect to 100 parts by mass of the active material was changed from 1 part by mass to 0.04 part by mass.

Example 17

An electrode was produced in the same manner as in Example 1 except that NTO-2 was used as the active material in place of NTO-1 and the blending amount of the fibrous carbon with respect to 100 parts by mass of the active material was changed from 1 part by mass to 2 parts by mass.

Comparative Example 4

A powder of NTO-2, sucrose, and pure water were mixed to obtain a dispersion. In the dispersion, the blending amount of sucrose with respect to 100 parts by mass of the active material was 5 parts by mass. This dispersion was subjected to spray drying to obtain a powder sample. The obtained powder sample was dried at a temperature of 100° C. for 12 hours to obtain an unfired active material composite. The unfired active material composite was fired under an inert atmosphere at a temperature of 700° C. for 3 hours to perform a carbonization treatment. In this manner, an active material composite NTO-C was obtained. The active material composite NTO-C was secondary particles containing carbon-coated primary particles.

An electrode was produced in the same manner as in Example 1 except that NTO-C was used as the active material in place of NTO-1 and the blending of the fibrous carbon was omitted.

[Measurement of Average Particle Size of Primary Particles, Covering Ratio, and Distance Between Primary Particles]

With respect to the electrodes obtained in Examples and Comparative Examples, the average particle size of the primary particles, the covering ratio, and the distance between the primary particles were measured by the above-described method. The results are shown in Table 2.

[Evaluation Test]

In order to evaluate the input-output performance and life performance of the electrodes obtained in Examples and Comparative Examples, an evaluation cell was produced. As the evaluation cell, a three-electrode cell was used. As the working electrodes, the electrodes obtained in Examples and Comparative Examples were used. As the counter electrode and the reference electrode, lithium metals were used. As the nonaqueous electrolyte, one obtained by dissolving $LiPF_6$ in a mixed solvent of ethylene carbonate (EC) and diethyl carbonate (DEC) was used. The volume ratio of EC and DEC in the mixed solvent was 1:2. The concentration of $LiPF_6$ was 1.0 mol/L.

(Evaluation of Input-Output Characteristics)

First, the evaluation cell was charged at a current value of 1 C. until the potential of the working electrode reached 1.0 V (vs. $Li/Li^+$). After the potential reached 1.0 V (vs. $Li/Li^+$), the evaluation cell was further charged while the potential of the working electrode was maintained at 1.0 V (vs. $Li/Li^+$) until the current value reached 0.05 C. After the current value reached 0.05 C, the evaluation cell was discharged at a current value of 0.2 C. until the potential of the working electrode reached 3.0 V (vs. $Li/Li^{3o}$). The discharge capacity until the potential reached 3.0 V (vs. $Li/Li^+$) was measured to obtain a discharge capacity W0.2 C.

Then, the evaluation cell was charged again at a current value of 1 C until the potential of the working electrode reached 1.0 V (vs. $Li/Li^+$). After the potential reached 1.0 V (vs. $Li/Li^+$), the evaluation cell was further charged while the potential of the working electrode was maintained at 1.0 V (vs. $Li/Li^+$) until the current value reached 0.05 C. After the current value reached 0.05 C, the evaluation cell was discharged at a current value of 5 C. until the potential of the working electrode reached 3.0 V (vs. $Li/Li^+$). The discharge capacity until the potential reached 3.0 V (vs. $Li/Li^+$) was measured to obtain a discharge capacity W5 C.

The discharge capacity ratio (W5 C/W0.2 C×100) was calculated by dividing the discharge capacity W5 C by the discharge capacity W0.2 C. The results are shown in Table 2.

(Evaluation of Life Characteristics)

First, the evaluation cell was charged at a current value of 1 C until the potential of the working electrode reached 1.0 V (vs. $Li/Li^+$). After the potential reached 1.0 V (vs. $Li/Li^+$), the evaluation cell was further charged while the potential of the working electrode was maintained at 1.0 V (vs. $Li/Li^+$) until the current value reached 0.05 C. After the current value reached 0.05 C, the evaluation cell was discharged at a current value of 1 C until the potential of the working electrode reached 3.0 V (vs. $Li/Li^+$). The discharge capacity until the potential reached 3.0 V (vs. $Li/Li^+$) was measured to obtain a discharge capacity W1 in the first cycle. This cycle was defined as one cycle, and 100 cycles were performed. The discharge capacity at the 100th cycle was measured to obtain a discharge capacity W100.

The capacity retention ratio (W100/W1×100) at the 100th cycle was obtained by dividing the discharge capacity W100 by the discharge capacity W1. The results are shown in Table 2.

The method of producing the electrodes according to Examples and Comparative Examples is summarized in Table 1 below.

TABLE 1

| | Method of producing electrodes | | | | | | |
|---|---|---|---|---|---|---|---|
| | | | | First binder | | Second binder | |
| | Active material | Fibrous carbon | Granular carbon | Type | Blending amount | Type | Blending amount |
| Ex. 1 | NTO-1 | 1 | 2 | CMC | 1.5 | SBR | 1.5 |
| Ex. 2 | NTO-1 | 1 | 2 | HPMC | 1.5 | SBR | 1.5 |
| Ex. 3 | NTO-1 | 1 | 2 | HEMC | 1.5 | SBR | 1.5 |
| Ex. 4 | NTO-1 | 1 | 2 | PVP | 1.5 | SBR | 1.5 |
| Ex. 5 | NTO-2 | 1 | 2 | CMC | 1.5 | SBR | 1.5 |
| Ex. 6 | NTO-3 | 1 | 2 | CMC | 1.5 | SBR | 1.5 |
| Ex. 7 | NTO-4 | 1 | 2 | CMC | 1.5 | SBR | 1.5 |
| Ex. 8 | NTO-1 | 2 | 2 | CMC | 2 | PVdF | 2 |
| Ex. 9 | NTO-1 | 1.5 | 1.5 | HPMC | 1.5 | PVdF | 1.5 |
| Ex. 10 | NTO-2 | 0.1 | 2 | HEMC | 1.5 | PVdF | 1.5 |
| Ex. 11 | NTO-5 | 0.04 | 4 | HEMC | 1.5 | PVdF | 1.5 |
| Ex. 12 | NTO-1 | 0.2 | 2 | CMC | 1.5 | PAN | 1.5 |
| Ex. 13 | NTO-6 | 0.5 | 2 | CMC | 1.5 | PAA | 1.5 |
| Ex. 14 | LNT-1 | 1 | 2 | CMC | 1.5 | PVdF | 1.5 |
| Ex. 15 | NTO-1 LTO-1 | 1 | 2 | CMC | 1.5 | PVdF | 1.5 |
| Ex. 16 | NTO-1 LNT-1 | 1 | 2 | CMC | 1.5 | PVdF | 1.5 |
| Comp. ex. 1 | NTO-7 | 1 | 2 | CMC | 1.5 | SBR | 1.5 |
| Comp. ex. 2 | NTO-8 | 2 | 2 | CMC | 2 | PVdF | 2 |
| Comp. ex. 3 | NTO-2 | 0.04 | 2 | CMC | 1.5 | SBR | 1.5 |
| Ex. 17 | NTO-2 | 2 | 2 | CMC | 1.5 | SBR | 1.5 |
| Comp. ex. 4 | NTO-C | — | 2 | CMC | 1.5 | SBR | 1.5 |

In Table 1, in the column under the heading "method of producing electrodes", the column labeled "active material" describes the type of the active material. In the column labeled "fibrous carbon", the blending amount of the fibrous carbon with respect to 100 parts by mass of the active material is described. In the column labeled "granular carbon", the blending amount of the granular carbon with respect to 100 parts by mass of the active material is described. Among the columns under the heading "first binder", the type of the first binder is described in the column labeled "type". In the column labeled "blending amount", the blending amount of the first binder with respect to 100 parts by mass of the active material is described. Among the columns under the heading "second binder", the type of the second binder is described in the column labeled "type". In the column labeled "blending amount", the blending amount of the second binder with respect to 100 parts by mass of the active material is described.

Electrode characteristics and battery characteristics according to Examples and Comparative Examples are summarized in Table 2 below.

TABLE 2

| | Electrode characteristics | | | | | Battery characteristics | |
|---|---|---|---|---|---|---|---|
| | Average particle size (μm) | S0 (μm$^2$) | S1 (μm$^2$) | covering ratio (%) | Distance between primary particles (nm) | Discharge capacity ratio (%) | Capacity retention ratio (%) |
| Ex. 1 | 1 | 0.79 | 0.18 | 22.8 | 90 | 79 | 83 |
| Ex. 2 | 1 | 0.79 | 0.09 | 11.4 | 90 | 75 | 78 |
| Ex. 3 | 1 | 0.79 | 0.05 | 6.3 | 85 | 72 | 77 |
| Ex. 4 | 1 | 0.79 | 0.10 | 12.6 | 95 | 76 | 79 |
| Ex. 5 | 2 | 3.14 | 0.11 | 3.5 | 55 | 70 | 81 |
| Ex. 6 | 1.2 | 1.13 | 0.14 | 12.4 | 80 | 77 | 79 |
| Ex. 7 | 0.3 | 0.70 | 0.19 | 27.1 | 100 | 86 | 75 |
| Ex. 8 | 1 | 0.79 | 0.31 | 39.2 | 95 | 81 | 82 |
| Ex. 9 | 1 | 0.79 | 0.16 | 20.2 | 75 | 80 | 83 |
| Ex. 10 | 2 | 3.14 | 0.004 | 0.1 | 60 | 75 | 79 |
| Ex. 11 | 0.5 | 0.20 | 0.002 | 1.0 | 100 | 78 | 74 |
| Ex. 12 | 1 | 0.79 | 0.01 | 1.3 | 50 | 73 | 81 |
| Ex. 13 | 1.7 | 2.27 | 0.15 | 6.6 | 35 | 70 | 82 |
| Ex. 14 | 1 | 0.79 | 0.28 | 35.4 | 70 | 82 | 86 |
| Ex. 15 | 1 | 0.79 | 0.25 | 31.6 | 80 | 83 | 88 |
| Ex. 16 | 1 | 0.79 | 0.21 | 26.6 | 80 | 81 | 80 |
| Comp. ex. 1 | 2.5 | 4.90 | 0.15 | 3.1 | 40 | 64 | 66 |
| Comp. ex. 2 | 0.8 | 0.50 | 0.22 | 44.0 | 70 | 66 | 70 |
| Comp. ex. 3 | 2 | 3.14 | 0.002 | 0.06 | 100 | 60 | 55 |
| Ex. 17 | 2 | 3.14 | 0.26 | 8.3 | 120 | 72 | 80 |
| Comp. ex. 4 | 2 | 3.14 | — | — | 80 | 59 | 68 |

In Table 2 above, among the columns under the heading "electrode characteristics", the average particle size of the primary particles obtained by the above-described method is described in the column labeled "average particle size (μm)". In the column labeled "S0 (μm²)", the average area of the primary particles obtained by the above-described method is described. In the column labeled "S1 (μm²)", the average area of the fibrous carbon obtained by the above-described method is described. In the column labeled "covering ratio (%)", the ratio of the average area of the fibrous carbon to the average area of the primary particles is described. In the column labeled "distance between primary particles (nm)", the average value of the distances between the first particles and the second particles obtained by the above-described method is described.

In Table 2 above, among the columns under the heading "battery characteristics", the discharge capacity ratio (W5 C/W0.2 C×100) obtained by dividing the discharge capacity W5 C by the discharge capacity W0.2 C is described in the column labeled "discharge capacity ratio (%)". In the column labeled "capacity retention ratio (%)", the capacity retention ratio (W100/W1×100) at the 100th cycle obtained by dividing the discharge capacity W100 by the discharge capacity W1 is described.

As shown in Table 2, the discharge capacity ratio and the capacity retention ratio of each of the cells using the electrodes according to Examples 1 to 17 were higher than the discharge capacity ratio and the capacity retention ratio of the cells using the electrodes according to Comparative Examples 1 to 4.

The electrode according to at least one of the embodiments described above includes primary particles having an average particle size of 0.3 μm or more and 2 μm or less, and the surface of the primary particles is coated with fibrous carbon at a coverage of 0.1% or more and 40% or less. Therefore, the electrode according to the embodiment is used, so that it is possible to improve the input-output performance and life performance of the secondary battery.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a negative electrode;
a positive electrode; and
a non-aqueous electrolyte,
wherein the negative electrode comprises an active material-containing layer, which includes: an active material containing primary particles of a niobium-titanium composite oxide; a first conductive agent containing fibrous carbon; and second conductive agent containing granular carbon,
wherein the niobium-titanium composite oxide has a monoclinic crystal structure and is represented by a formula (I);

$$Li_aTi_{1-x}M1_xNb_{2-y}M2_yO_{7-\delta} \qquad (I)$$

where $0 \leq a < 5$, $0 \leq x < 1$, $0 \leq y < 1$, and $-0.3 \leq \delta \leq 0.3$, each of the element M1 and the element M2 is at least one element selected from the group consisting of Fe, Ni, W, Ta, and Mo, and the element M1 and the element M2 may be the same or different from each other,
wherein the primary particles have an average particle size of 0.3 μm or more and 2 μm or less, and
at least a part of a surface of the primary particles is coated with the fibrous carbon, and a covering ratio of the primary particles by the fibrous carbon is 0.1% or more and 40% or less.

2. The secondary battery according to claim 1, wherein the average particle size of the primary particles is obtained by a scanning electron microscopic image of a section of the active material-containing layer at a magnification of 10000, and the covering ratio is obtained by a scanning electron microscopic image of a section of the active material-containing layer at a magnification of 50000.

3. The secondary battery according to claim 1, wherein an average distance between the primary particles in the active material-containing layer is greater than 0 and 100 nm or less.

4. The secondary battery according to claim 1, wherein the fibrous carbon has a fiber diameter in a range of 1 nm or more and 50 nm or less.

5. The secondary battery according to claim 1, wherein the granular carbon has an average particle size in a range of 10 nm or more and 300 nm or less.

6. The secondary battery according to claim 1, wherein the active material-containing layer further includes a first binder and a second binder,
the first binder contains at least one compound selected from the group consisting of carboxymethyl cellulose, hydroxypropyl methylcellulose, hydroxyethyl methylcellulose, and polyvinyl pyrrolidone, and
the second binder contains at least one compound selected from the group consisting of styrene-butadiene rubber, polyvinylidene fluoride, polyimide, polyamide imide, polyacrylic acid, and polyacrylonitrile.

7. A battery pack comprising the secondary battery according to claim 1.

8. The battery pack according to claim 7, further comprising an external power distribution terminal and a protective circuit.

9. The battery pack according to claim 7, which includes plural of the secondary battery and the plural of the secondary battery are electrically connected in series, in parallel, or in combination of series and parallel.

10. A vehicle comprising the battery pack according to claim 7.

11. The vehicle according to claim 10, which comprises a mechanism configured to convert kinetic energy of the vehicle into regenerative energy.

12. The secondary battery according to claim 1, wherein the nonaqueous electrolyte comprises an organic solvent.

13. The secondary battery according to claim 1, wherein the granular carbon has an average particle size in a range of 50 nm or more and 300 nm or less.

14. The secondary battery according to claim 1, wherein the granular carbon has an average particle size in a range of 50 nm or more and 200 nm or less.

15. The secondary battery according to claim 1, wherein, in the niobium-titanium composite oxide represented by the formula (I), x is greater than 0.

16. The secondary battery according to claim 1, wherein an average distance between the primary particles in the active material-containing layer is in a range of 35 nm or more to 120 nm or less.

17. The secondary battery according to claim 1, wherein the average particle size of the primary particles is in a range of 0.4 μm or more and 1.3 μm or less.

18. The secondary battery according to claim 1, wherein the covering ratio is in a range of 1% or more and 30% or less.

19. The secondary battery according to claim 1, wherein the average particle size of the primary particles is in a range of 0.5 μm or more and 0.9 μm or less, and wherein the covering ratio is in a range of 5% or more and 20% or less.

20. The secondary battery according to claim 6, wherein the fibrous carbon is carried on a surface of the primary particles, wherein the granular carbon is arranged on the surface of the primary particles carrying the fibrous carbon, and wherein at least a part of the surface of the primary particles which is not coated with the fibrous carbon and the granular carbon is coated with the first binder.

* * * * *